United States Patent [19]

Charland

[11] 4,311,160
[45] Jan. 19, 1982

[54] FLUID MIXING VALVE

[76] Inventor: Léo Charland, 9620 Blvd. Gouin West, Pierrefonds, Prov. of Quebec, Canada, H8Y 1R5

[21] Appl. No.: 187,947

[22] Filed: Sep. 16, 1980

[51] Int. Cl.³ ............................................. F16K 19/00
[52] U.S. Cl. ..................................... 137/111; 137/895
[58] Field of Search ........................ 137/111, 114, 895

[56] References Cited

U.S. PATENT DOCUMENTS

| | | | |
|---|---|---|---|
| 1,113,644 | 10/1914 | Jones | 137/111 |
| 1,988,635 | 1/1935 | Sutton | 137/114 X |
| 2,903,009 | 9/1959 | Tacchi | 137/111 X |
| 3,489,162 | 1/1970 | Meynell | 137/111 X |
| 4,005,803 | 2/1977 | Kent | 137/114 X |
| 4,228,958 | 10/1980 | Perry | 137/114 X |

*Primary Examiner*—Robert G. Nilson

[57] ABSTRACT

This fluid mixing valve is particularly adapted to mix steam and water to operate a liquid nozzle gun as for instance in the food processing industry to wash utensils and equipment. This valve is adapted to be connected upstream of the gun in particular to prevent burns by the steam, to minimize the waste of steam, and to minimize the occurrence and effects of water hammers resulting from mixing steam with water. This valve comprises a body defining a steam inlet, a water inlet, a heated water outlet, a heat exchanger connecting both inlets to the outlet, a piston chamber, and a venturi nozzle merging the chambers of the heat exchanger for flow of water under suction by the steam flow. A valve closes the steam inlet under the action of a piston responsive to the pressure in the liquid inlet and a bleed valve and passage are arranged to bleed unintentional flow of water when the mixing valve is closed to prevent unintentional opening of the valve.

6 Claims, 4 Drawing Figures

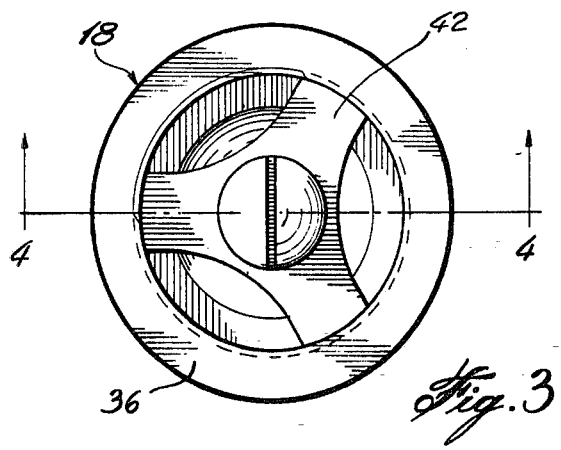
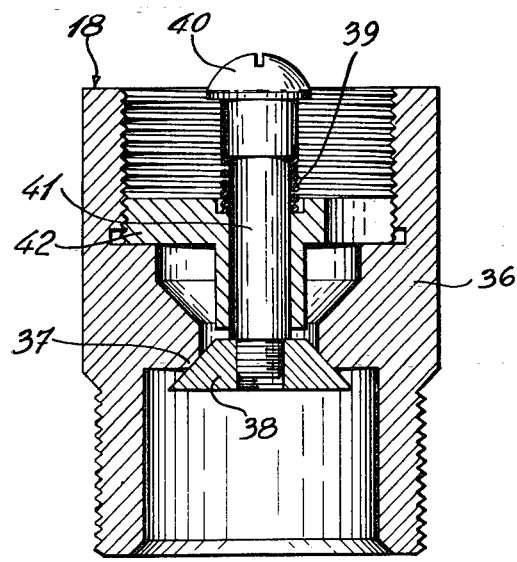

FLUID MIXING VALVE

This invention relates to a valve to mix two fluids, and, in particular, to a valve adapted to mix steam and water to produce hot water at will as required for instance in the food processing industry to wash utensils and equipment with a liquid nozzle gun.

In the above mentioned instance, the user of the gun had so far to adjust the inlet flow of the steam and water to produce a liquid jet of predetermined temperature. This has been done so far by more or less closing of either of two inlet supply valves to use more or less of steam and water relative one to the other. The two valves were closed to totally stop the flow to and through the gun. Among other things, it has been noted that such prior art practice required resetting of each of the two valves after each interruption of operation of the liquid nozzle gun. That was found a hazard since the user could easily be burnt by steam only coming out of the gun when resuming operation. Besides, with the prior art system, steam only could easily remain in the gun and in the hose to the gun, thus causing burns and relatively fast deterioration of the hose.

It is a general object of the present invention to provide a fluid mixing valve in particular of the above type to be used with a liquid nozzle gun such as to obviate the above mentioned disadvantages.

It is a more specific object of the present invention to provide a fluid mixing valve in particular of the above type that is safe and reliable to operate with steam and water of varying pressures and temperatures.

It is another object of the present invention to provide a fluid mixing valve in particular of the above type that need not be closed nor reset after shut off of the liquid nozzle gun used in association therewith.

It is a further object of the present invention to provide a fluid mixing valve in particular of the above type wherein the steam passage is self-closing when the pressure drop differential is too large between the steam and the liquid supplies to avoid burning by excessive use of steam.

It is still another object of the present invention to provide a fluid mixing valve in particular of the above type wherein the liquid inlet is drained when the valve is in its closed position to avoid unintentional opening of the valve when the liquid inlet line is forgotten in partially open position.

It is a still further object of the present invention to provide a fluid mixing valve in particular of the above type that is provided with check valves and appropriate heat exchanger chamber to minimize the production and effect of water hammers and the like pressure waves resulting from mixing steam and water.

The above and other objects and advantages of the present invention will be better understood with reference to the following detailed description of a preferred embodiment thereof which is illustrated, by way of example, in the accompanying drawings, in which:

FIG. 3 is an end view of a check valve identified by the letters CV in the fluid mixing valve of FIG. 1; and FIG. 4 is a cross-sectional view of the same check valve as seen along line 4—4 in FIG. 3.

Figure 1:
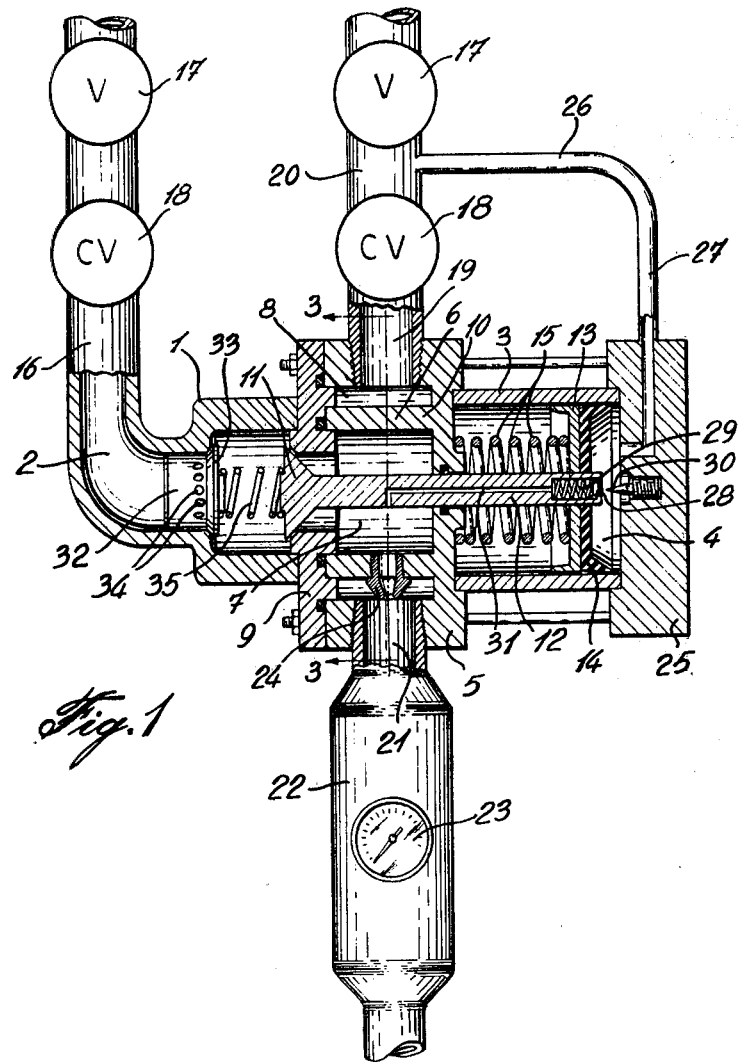
FIG. 1 is a cross-sectional view through a fluid mixing valve according to the present invention.
Figure 2:
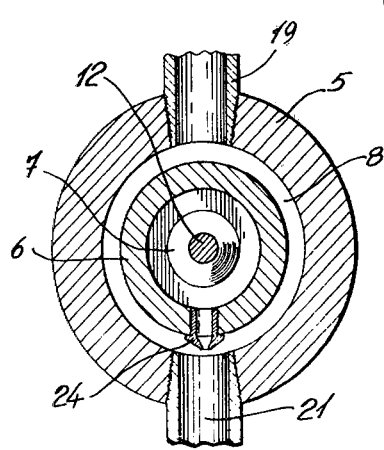
FIG. 2 is a cross-sectional view as seen along line 2—2 in FIG. 1.

The illustrated fluid mixing valve comprises a casing of generally cylindrical shape having an end 1 defining an inlet 2 for a first fluid such as steam and also having an opposite end 3 defining a piston chamber 4. The casing also includes an intermediate portion 5 defining a heat exchanger in which an annular partition 6 defines an inner steam chamber 7 and an outer water chamber 8 annularly surrounding the inner steam chamber. The intermediate casing portion 5 includes axially opposite walls 9 and 10. The wall 9 closer to the steam inlet is bored to form a seat for a conical valve 11 while the other wall 10 is bored to axially slide a piston rod 12 therein. The conical valve 11 is fixedly secured to one end of the piston rod 12 while a piston 13 is secured to the other end of the piston rod. The conical valve 11 is adapted to engage the valve seat in the wall 9 to close the steam inlet against the flow of steam to the inner steam chamber 7. The piston 13 is provided with a cup seal 14 and is axially displaceable in the piston chamber. A compression spring 15 is engaged around the piston rod 12 in abutment with the piston 13 and the wall 10 of the fixed intermediate portion 5. Thus, the piston, piston rod, and valve are bodily biased toward closing engagement of the conical valve 11 with its valve seat defined by the wall 9.

The steam inlet 2 extends into a tubular steam supply pipe 16 serially featuring a manual valve 17 and a check valve 18. The manual valve 17 is of any appropriate and known construction to set the steam flow from nothing to full flow. The check valve 18 will be described in details later with particular reference to FIGS. 3 and 4.

A water inlet 19 communicates with the annular water chamber 8 and extends into a water supply pipe 20 also serially featuring a manual valve 17 and a check valve 18 as afore and hereafter described.

A mixed fluid outlet or heated water outlet 21 communicates with the annular water chamber 8 diametrically opposite the water inlet 19. The heated water outlet communicates with a mixing chamber 22 to enhance mixing of the steam and water. A temperature gauge 23 is secured to the mixing chamber 22 to indicate the temperature of the heated water at the outlet. A venturi nozzle 24 communicates with the steam chamber 7 and has its venturi nozzle end projecting toward the heated water outlet 21 and extending through the annular water chamber 8. Thus, the flow of steam outward through the venturi nozzle 24 will produce a suction of water from the annular water chamber toward the heated fluid outlet 21.

The outer end of the piston chamber 4 is closed by a cap 25 which cooperatively forms with a tube 26 an auxiliary water passage 27 communicating the water inlet with the piston chamber.

A ball 28 and a spring 29 form a valve in the outer end of the piston rod 12. A pin 30 projects into the piston chamber from the cap 25, in axial alignment with the ball 28 to unseat the latter and open that valve when the piston 13 and the valve 11 are fully retracted in closing position. A bleed passage 31 extends in the piston rod and communicates the bleed valve 28 with the outlet 21 through the inner steam chamber 7 and the venturi nozzle 24.

A flow regulator valve is mounted in the steam inlet and includes a sleeve valve 32 having a closed end at 33 to totally interrupt the steam flow. The sleeve valve 32 is provided with lateral apertures 34 whose gradual uncovering regulates the steam flow. A spring 35 axially biases the sleeve valve against uncovering of the aperture 34 by the pressure differential upstream and downstream of that valve. The latter serves to delay or slow down the flow of steam until after opening of the valve 11 and thus until after starting of the flow of water.

The check valve 18 in the inlet tubes 16 and 20 will now be described in details with reference to FIGS. 3 and 4. This check valve includes a tubular casing threaded to be serially coupled to the corresponding inlet tube. A valve seat 37 is formed by the casing 36 to seat a valve 38 against it under the bias of a spring 39. The latter is held captive between the enlarged head 40 of a valve stem 41 and a spider piece 42 slidably guiding the valve 38.

When the user wants to have heated water, he opens the two valves 17. Then, the steam unseats the sleeve valve 32 while the water through the passage 27 acts on the piston 13 and thus unseats also the valve 11 for the steam. If the valve 17 for the water is not sufficiently open, or if the pressure of the water is too low, the valve 11 will not be opened to prevent the dispensing of mostly steam at the outlet 21.

What I claim is:

1. A fluid mixing valve comprising a body defining a first inlet for a first warmer fluid, a second inlet for a second colder fluid, an outlet for a mixer fluid, and a piston chamber; a valve serially positioned intermediate said first inlet and the mixed fluid outlet and biased toward closing of said first inlet; a piston in said piston chamber operatively displaceable with said valve and acting thereon for opening thereof; a passage means for the second fluid operatively communicating said second inlet with the piston chamber whereby upon unsufficient pressure of the second fluid, the piston and the valve will be allowed to move until closure of the valve and interruption of the flow of the first fluid outward through the mixed fluid outlet; first and second adjacent fluid passages forming a heat exchanger portion, said first fluid passage connected to said first inlet downstream of said valve and the second fluid passage connected to said second inlet whereby said first fluid preheats said second fluid in said heat exchanger portion; a mixing chamber disposed intermediate and connected to said outlet and to said second fluid passage and a venturi nozzle opening within said mixing chamber and connected to said first fluid passage downstream from the latter.

2. A fluid mixing valve as defined in claim 1, further including a check valve connected to each fluid inlet and constructed and arranged to minimize water hammers and the like pressure waves being transmitted upstream into the fluid supplies connected to said inlets respectively.

3. A fluid mixing valve as defined in claim 2, wherein said body includes a generally cylindrical casing having one end portion defining said first fluid inlet, the other end portion defining said piston chamber, and an intermediate portion defining the heat exchanger portion, the other fluid inlet, and the mixed fluid outlet, a piston rod axially extends into said generally cylindrical casing and is secured at one end to said valve for said first inlet and at the other end to said piston, said intermediate portion includes axially opposite sides with one of the latter being axially bored for axial sliding displacement of the piston and therethrough and with the other of the opposite sides forming a valve seat for the valve for said first inlet, and a manual flow control valve is connected to each of said inlets to adjust the flow of said fluids therethrough in relation with the desired temperature for the mixed fluid at the outlet.

4. A fluid mixing valve as defined in claim 3, further including a bleed valve secured to said other end of the piston rod for axial displacement therewith, a projection extends into the piston chamber in axial alignment with the bleed valve and is arranged to unseat and open the latter upon axial displacement of the piston to the closing position for the valve of said first fluid, a bleed passage extends longitudinally in the piston rod in communication with the bleed valve and with said inner chamber to bleed any of the second fluid that can unintentionally flow into the piston chamber through said passage means.

5. A fluid mixing valve as defined in claim 1, wherein a bleed valve is secured to the piston and axially displaceable therewith, an axial projection extends into the piston chamber in axial alignment with the bleed valve and operatively unseats and opens the bleed valve by axial engagement therewith upon displacement of the piston to the position of closure of the valve for said first fluid, and a bleed passage communicates the bleed valve with the outlet for a mixed fluid whereby upon said closure of the valve for said first fluid, the bleed valve is kept open by engagement of said axial projection therewith to bleed any of the second fluid that unintentionally flows into the piston chamber through said passage means.

6. A fluid mixing valve as defined in claim 1, further comprising a flow regulator valve mounted into said first inlet and including a sleeve valve member axially displaceable in a range going from a fully closed position to a fully open position, and having lateral apertures gradually uncovered upon displacement through said range and spring means axially biasing said sleeve valve member toward the closed position thereof.

* * * * *